Patented July 20, 1943

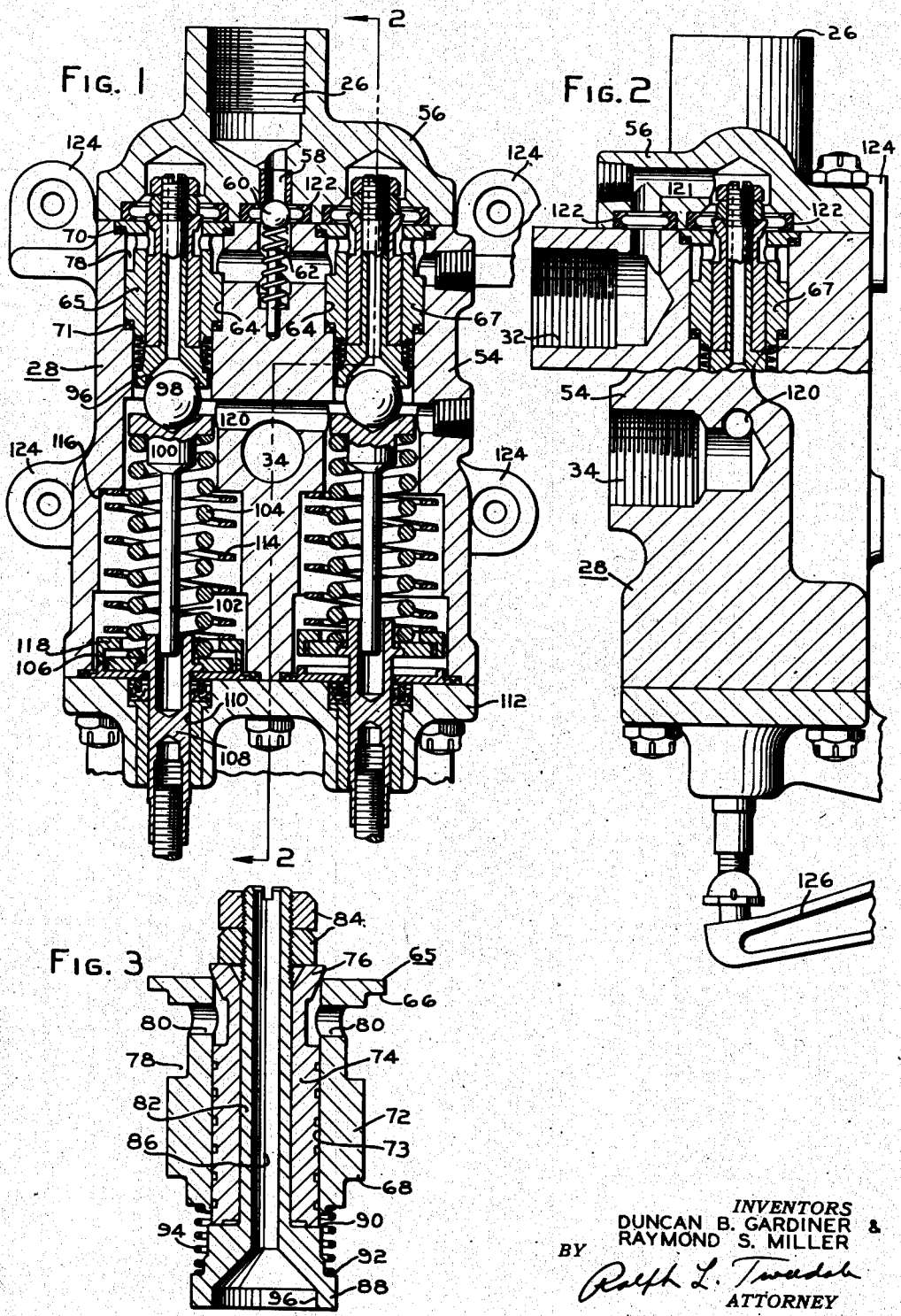

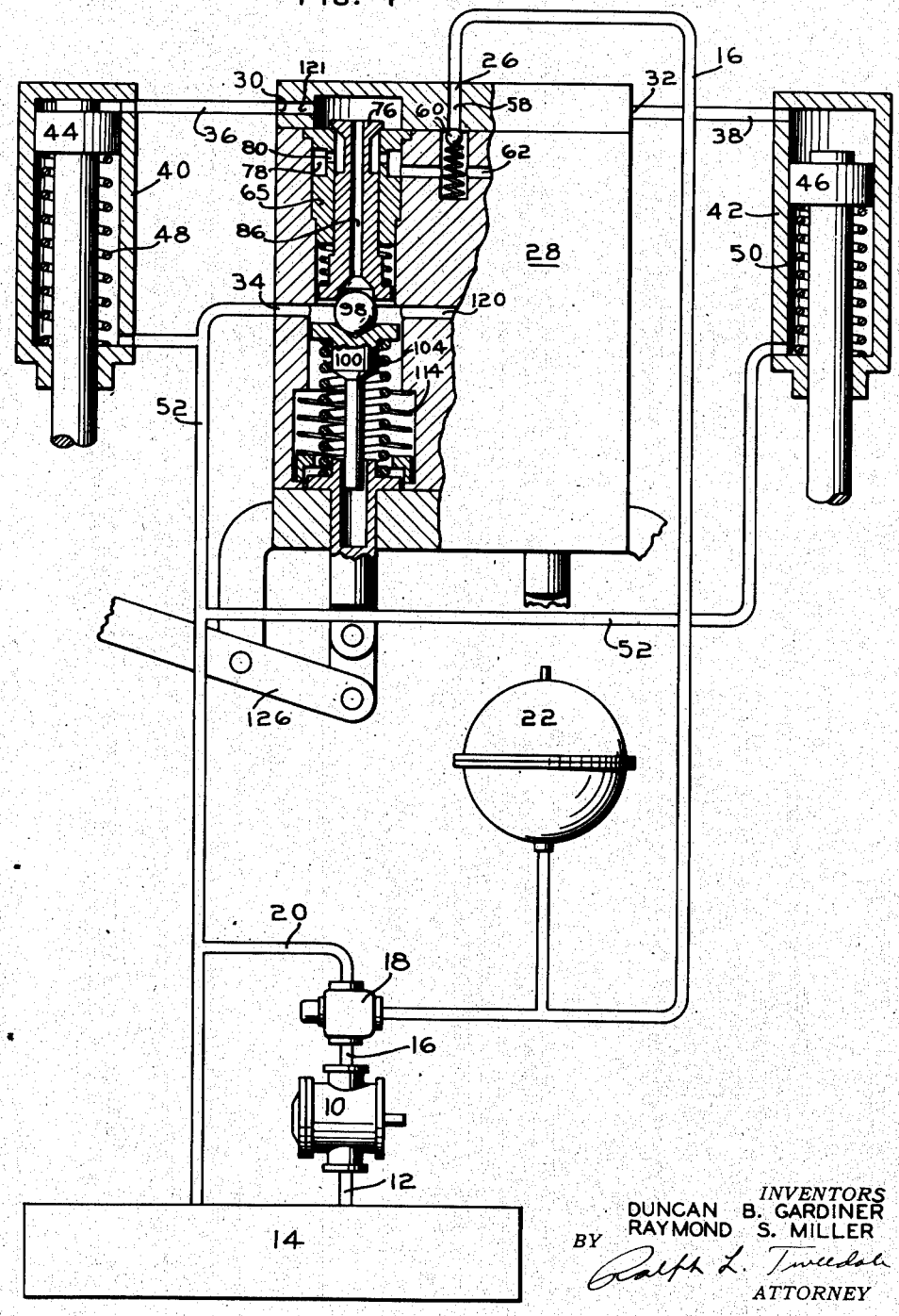

2,324,690

UNITED STATES PATENT OFFICE 2,324,690

VALVE DEVICE

Duncan B. Gardiner and Raymond S. Miller, Detroit, Mich., assignors to Vickers Incorporated, Detroit, Mich., a corporation of Michigan Application January 16, 1941, Serial No. 374,616

3 Claims. (Cl. 303—54)

This invention relates to power transmissions, particularly to those of the type comprising two or more fluid pressure energy translating devices one of which may function as a pump and another as a fluid motor.

The invention is more particularly concerned with power transmission systems adapted for use in applying selectively variable force to a load device such as a vehicle or aircraft brake.

In operation of such a load it is desirable that the force applied to the load be under operator control in such a manner that the manual effort applied to the controlling element determines the force applied to the load as distinguished from a condition where the distance through which the controlling element is moved determines such force. In other words, it is desirable that the control have the same "feel" as occurs in a system where the manual effort is transmitted directly to the load without amplification from an outside source.

Systems heretofore proposed for providing such control have been limited both in the range over which the force applied to the load may be varied and also in sensitivity to small changes in force applied to the control element.

It is an object of the present invention therefore to provide an improved power transmission system for applying selectively variable force to a load device and which provides a wide range of variation of force applied and with a far greater sensitivity of adjustment than has been heretofore achieved.

It is a further object to provide an improved control valve for use in such a transmission system and wherein the principal working parts of the valve are arranged in the form of a cartridge which may be readily replaced should the parts become worn and which moreover may be assembled in operative relationship for adjustment and testing before the cartridge is mounted in the main valve body.

Further objects and advantages of the present invention will be apparent from the following description, reference being had to the accompanying drawings wherein a preferred form of the present invention is clearly shown.

In the drawings:

Figure 1 is a longitudinal cross section of a valve incorporating a preferred form of the present invention.

Figure 2 is a cross section on line 2—2 of Figure 1.

Figure 3 is a longitudinal sectional view on a larger scale of the sub-assembly and refers to the mechanism of Figure 1.

Figure 4 is a diagrammatic view of a brake control circuit incorporating the valve illustrated in Figure 1.

Referring now to Figure 4, a pump 10 may be driven by any suitable prime mover, not shown, and has a suction conduit 12 through which fluid may be withdrawn from a tank 14 and discharged to a delivery conduit 16. Incorporated in the conduit 16 is an unloading valve 18 of any suitable construction for diverting the pump delivery through a pipe 20 whenever a predetermined pressure exists in an accumulator 22 connected into the line 16 beyond the valve 18.

The line 16 connects to a pressure port 26 of a duplex brake control valve 28 having cylinder ports 30 and 32 and a tank port 34. The cylinder ports connect by conduits 36 and 38 with a pair of single-acting cylinders 40 and 42 in which are slidably mounted pistons 44 and 46. The pistons may be biased upwardly by springs 48 and 50 or may be connected to a load which biases the pistons in the same direction. A tank conduit 52 connects the port 34 and also the rod ends of cylinders 40 and 42 with the tank 14.

Referring now to Figures 1 through 3, the constructional details of the valve 28 are there illustrated. The valve may comprise a body 54 provided with an end cap 56 at its upper end in which is formed the port 26 which connects by a conduit 58 with a check valve 60. Leading from the check valve 60 is a conduit 62 having lateral branches which open into a pair of longitudinal bores 64 in the body member 54. Mounted in each of the bores 64 is an equalizer valve cartridge 65 and 67, both of which are identical so that a description of one will suffice for the other.

These cartridges which are illustrated on a larger scale in Figure 3 are provided with shoulders at 66 and 68 which abut suitable packing rings 70 and 71 whereby the cartridge is sealed in the bore 64 and retained therein by the cover plate 56.

Each cartridge comprises a sleeve member 72 having a central bore 73 in which is slidably mounted a two-part admission valve 74 having a poppet head 76 adapted to rest on the seat formed by the upper end of the bore 73. The sleeve 72 is provided with an annular groove 78 communicating with the passages 62 and has cross bores 80 providing communication between the interior of bore 73 and the groove 78.

The admission valve 74 includes a second part 82 telescoped within the outer part and secured by a nut 84. The member 82 is provided with a central bore 86 and at its lower end is provided with an enlarged head 88 which provides a shoulder 90 forming a stop to limit upward movement of the valve and a shoulder 92 forming a spring abutment for a light spring 94 which normally biases the valve to closed position. At the lower end the bore 86 is enlarged as indicated at 96 to a diameter approximately equal to the diameter of bore 73.

Mounted to seat on the lower edge of bore 96 is an exhaust valve comprising a ball 98 which is supported on its lower side by a member 100 having a stem 102. The member 100 and ball 98 are urged upwardly by a heavy spring 104, the upper end of which rests against the bottom of member 100. The lower end of spring 104 abuts a washer 106 carried by a sliding control stem 108 which projects through a packed opening 110 in the lower end cap member 112 which is secured to the body 54. Preferably a light auxiliary return spring 114 is mounted in an enlarged portion of bore 64 between a shoulder 116 and an abutment washer 118. The latter is adapted to be picked up by the washer 106 after slight initial upward travel of the control stem 108.

The lower portion of the bore 64 communicates by a cross passage 120 with the tank port 34. The motor ports 30 and 32 communicate with the upper end of bore 64 above the cartridge 65 through a passage 121 formed in the upper end cap 56. Suitable sealing rings 122 are provided for preventing leakage between the various passages which cross the parting line between cap 56 and body 54. The body 54 is provided with mounting lugs 124.

The control stems 108 may each be operated by means of any suitable mechanism as, for example, the lever indicated at 126 in Figure 2.

In operation, with the pump 10 running and with a supply of oil maintained under pressure in the accumulator 22, and with the parts in the position illustrated in Figures 1 to 3, the force exerted by spring 104 upwardly on exhaust valve 98 is very light, and any oil under pressure in cylinder 40 will be exhausted through conduit 36, port 30, passage 121, bores 86 and 96, passage 120, port 34 and conduit 52 to tank. When the pressure in cylinder 40 has fallen to a value where it no longer can overcome the light force of spring 104, the exhaust valve 98 will close, thus maintaining a small minimum pressure in the cylinder 40 which, however, is insufficient to overcome the spring 48 and project the piston 44.

When it is desired to project the piston 44 downwardly, the control stem 108 may be moved upwardly to compress spring 104 to any degree desired. It will be seen that the force of spring 104 is opposed by the hydraulic pressure in the cylinder 40 acting downwardly on the exhaust valve 98 over the full area of the bore 96. Since the pressure in cylinder 40 to start with is insufficient to overcome the added force of spring 104 caused by the initial compression thereof, the admission valve will be lifted upwardly to admit pressure oil from port 26 through passage 58, check valve 60, passage 62, groove 78, passage 80 and past the poppet valve 76 to the passage 121. This flow will continue until the pressure in the cylinder 40 has been raised to a value just balancing the upward force of spring 104. At this point the admission valve will close by reason of the light spring 94.

When it is desired to reduce the pressure in the cylinder 40, the control stem 108 may be lowered, thus reducing the upward force on exhaust valve 98 and permitting the hydraulic pressure to preponderate and open the same until the cylinder pressure has fallen to its balancing value.

It will be noted that the admission valve is hydraulically balanced as to the pressure supply and as to the motor pressure, although it will be understood that, particularly as to motor pressure, the admission valve may, if desired, be given a slight unbalance tending to seat the same. This may be done by making the diameter of bore 96 slightly smaller than the diameter of bore 73. Thus, whether absolutely or approximately balanced, the motor pressure is made to react against the exhaust valve 98 and through spring 104 this reaction is felt at the control stem 108, giving the operator a reaction in exact proportion to the pressure being applied in cylinder 40.

The cartridge or sub-assembly 65 is so constructed that the admission valve may be assembled in complete operative relationship of all its parts which facilitates initial fitting, adjustment and testing, all of which may be done before placing the cartridge in the bore 64. Likewise, in the event of failure of a cartridge, it may be readily replaced in the field.

While the form of embodiment of the invention, as herein disclosed, constitutes a preferred form, it is to be understood that other forms might be adopted, all coming within the scope of the claims which follow.

What is claimed is as follows:

1. An equalizing valve comprising a body having a longitudinal bore providing a motor port, an exhaust port and a pressure port intermediate said other ports, a cartridge removably mounted in said bore having one end exposed to the motor port and its opposite end exposed to the exhaust port, said cartridge constituting a unitary sub-assembly comprising an inlet valve and an exhaust valve seat together with a sleeve member providing a mounting and seat for the inlet valve, said sleeve having a transverse passage communicating with the pressure port and sealed from the other ports, an exhaust valve seating on the exhaust valve seat and adapted to transmit lifting forces to the inlet valve, and means for operating said valves conjointly to variably regulate the pressure in the motor port, said cartridge having all of its parts assembled in operative and nonseparable relationship prior to assembly into the bore.

2. An equalizing valve comprising a body having a longitudinal bore providing a motor port, an exhaust port and a pressure port, a cartridge removably mounted in said bore, said cartridge constituting a unitary sub-assembly comprising an inlet valve and an exhaust valve seat together with a sleeve member providing a mounting and seat for the inlet valve, an exhaust valve seating on the exhaust valve seat and adapted to transmit lifting forces to the inlet valve, and means for operating said valves conjointly to variably regulate the pressure in the motor port, said cartridge having all of its parts assembled in operative and non-separable relationship prior to assembly into the bore.

3. A cartridge sub-assembly for an equalizing valve comprising a sleeve having a central bore open at both ends with a transverse bore intersecting the same intermediate its ends, an inlet seat formed at one end of the central bore, a combined inlet valve and exhaust seat slidable in and extending through the central bore, and having a passage extending from end to end thereof, and spring means yieldably retaining the inlet valve on its seat.

DUNCAN B. GARDINER.
RAYMOND S. MILLER.